United States Patent [19]

Rozek

[11] 4,408,361
[45] Oct. 11, 1983

[54] DIVERTER VALVE

[75] Inventor: Roy J. Rozek, Plymouth, Wis.

[73] Assignee: Kohler Co., Kohler, Wis.

[21] Appl. No.: 395,790

[22] Filed: Jul. 6, 1982

[51] Int. Cl.³ .......................... E03D 1/24; E03D 1/30
[52] U.S. Cl. ...................................... 4/331; 137/436; 4/332
[58] Field of Search .................. 4/300, 353, 355, 356, 4/378, 379, 395, 326, 329–332, 415; 137/436, 441, 448, 625.46, 875, 876

[56] References Cited

U.S. PATENT DOCUMENTS

| 1,670,323 | 5/1928 | Teahen et al. | 4/331 |
| 1,670,324 | 5/1928 | Teahen et al. | 4/331 |
| 1,670,326 | 5/1928 | Teahen | 4/331 |
| 1,763,524 | 6/1930 | Joiner, Jr. | |
| 1,971,880 | 8/1934 | Taylor | 4/331 |
| 2,501,589 | 3/1950 | Teahen | 4/331 |
| 3,147,762 | 9/1964 | Ducey | 4/331 |
| 3,172,128 | 3/1965 | Ducey | 4/331 |
| 3,348,242 | 10/1967 | Wilhelm | 4/435 |
| 4,024,589 | 5/1977 | Klessig | 4/331 |
| 4,077,602 | 3/1978 | Klessig | 4/374 |

OTHER PUBLICATIONS

Several pages of schematic drawings of a prior art diverter valve being marketed by Masco Company, admitted prior art.

Primary Examiner—Stephen Marcus
Assistant Examiner—Kenneth S. Putnam
Attorney, Agent, or Firm—Quarles & Brady

[57] ABSTRACT

A diverter valve for a fluid storage tank such as the storage tank of a water closet is disclosed. In one embodiment, the diverter valve has a housing with an inlet passage for receiving a supply of water and a pair of outlet passages. One of the outlet passages delivers pressurized water from the diverter valve to the storage tank, and the other outlet passage delivers the pressurized water to a diversion conduit connected to the toilet bowl rim. The diverter valve also includes a movable flap mounted within the diverter valve which moves to proportion the flow of water between the two outlet passages in response to changes in the water level of the tank. The flap is initially positioned to direct water to the tank when the tank water level is high. The flap is then moved by a water level sensor such as a float to direct water to the bowl rim when the water level in the storage tank has dropped below a pre-determined diversion level. Flow to the bowl rim continues even after the tank has emptied. A special bleed line in communication with the supply line is provided to allow a portion of the water supply to flow into the storage tank even when the water level is below the diversion level, so as to refill the tank.

5 Claims, 8 Drawing Figures

DIVERTER VALVE

BACKGROUND OF THE INVENTION

A. Field of the Invention

The present invention relates to fluid storage systems of the type having an inlet conduit and at least two outlet conduits. It appears to be especially useful in connection with water closets which direct pressurized water from the inlet supply line to the bowl to assist in cleaning the bowl.

B. Description of the Art

Water closets are usually constructed with a storage tank connected to a water supply, an inlet float valve which controls the flow of water into the tank from the water supply, a flush valve which controls the flow of water out of the tank, and a toilet bowl having at least one passage connecting the tank and bowl and an outlet passage connecting the bowl to the sewer line. Water entering the bowl will normally create a swirling, siphoning action to assist in the evacuation of the bowl.

Typically some of the water entering the bowl enters through the rim, which has the additional effect of washing the sides of the bowl. After the bowl has been evacuated, water will refill in the bowl to such a level as to provide a seal against the leakage of sewer gases.

Given the limitations imposed by water conservation requirements, such water closets often have problems keeping the sides of the bowl clean. Further, they often exhibit clogging problems and incomplete evacuation. This problem is exaggerated by users who dispose of various types of foreign objects such as paper kitchen towels which are specially designed to resist being broken up by water.

In order to improve the performance of water closets, attempts were made to develop a water closet which diverted pressurized water from the water supply line to the bowl during part of the flush cycle. When the supply line water is directed to the bowl, it can be used to assist in cleaning the sides of the bowl and the evacuation of the bowl.

A number of prior art water closets were developed which attempted to use pressurized water in this manner. However, most of these devices suffered from reliance on linkages keyed to the operation of the tank flush valve which cut off pressurized flow to the bowl as soon as the tank had emptied. The diversion of pressurized water to the bowl could therefore not be continued after the flush valve closed. Further, many of these linkages were complex, leading to high maintenance costs.

Other water closets that were developed were adaptable to only a limited range of water supply pressure conditions. Still other valves proved unreliable in operation.

Therefore, it can be seen that the need exists for a pressurized water diverter system which improves upon the performance of prior art systems in dealing with these problems. An improved diverter system is especially of interest with regard to low profile designer type toilets where the height of the toilet tank is severely restricted. As a consequence of this low height, there is often a much smaller head of water available to produce an effective wash of the sides of the toilet bowl.

SUMMARY OF THE INVENTION

The present invention relates to a diverter valve for a fluid storage tank such as the storage tank of a water closet. In one embodiment, the water closet has a bowl, a storage tank, an inlet in the tank for connection to a supply of water, an outlet leading from the tank to the bowl, an inlet valve which controls the flow of water to the tank in response to changes in the water level of the tank, a flush valve controlling the discharge of water through the outlet to the bowl, the flush valve being manually operable so as to initiate a flushing cycle of the water closet and automatically closing in response to the emptying of the storage tank, and a diversion conduit for directing water from the inlet directly to the bowl.

The diverter valve of the present invention includes a housing having an inlet passage for receiving a supply of water from the tank inlet valve, a first outlet passage communicating with the inlet passage for delivering water exiting from the diverter valve to the storage tank, and a second outlet passage communicating with said inlet passage for delivering water exiting from the diverter valve to the diversion conduit. A diverter means (e.g. a flap) is mounted in a diverter valve passage for proportioning the flow of water between the two outlet passages, and water level sensing means, preferably a float and axle connected to the flap, moves the flap in response to changes in the water level of the tank.

The flap is positioned by the water level sensing means so as to direct water to the first outlet passage when the flush cycle of the water closet is first initiated, and to the second outlet passage when the water level in the storage tank has dropped below a predetermined diversion level. The water level sensing means also holds the flap in place to allow continued flow to the second outlet passage after the flush valve has closed in response to the emptying of the tank.

There is also provided a bleed means or line in communication with the water supply. The bleed means allows a portion of the water supply to continue to flow into the storage tank whenever the inlet valve is on. Water entering the tank through the bleed means raises the water level above the diversion level after the tank has emptied.

In the preferred embodiment, the water level sensing means is a float connected to the external end of an axle which is rotatably mounted in a wall of a diverter valve passage. The other end of the axle projects into the diverter passage and has a diverter flap connected thereto. The float follows the water level of the tank and moves the flap to direct water towards the first outlet passage when the water level in the tank is above the diversion level, and to divert water to the second outlet passage when the water level is below the diversion level. To minimize fluttering of the flap during the refilling of the tank, a projection which extends inwardly from an interior wall of the diverter valve passage adjacent to the second outlet passage is used.

The diverter valve of the present invention provides a means for continuing the flow of pressurized cleaning water to the bowl after the flush valve closes. The bowl can therefore be cleaned both during the emptying of the tank, and for an extended period thereafter.

In that no mechanical linkages are required to connect the diverter valve and the flush valve, the diverter valve acts independently of the flush valve. This simplifies the flush mechanism, and allows greater flexibility in locating the component parts of the valving in the toilet tank. Further, as the previously mentioned bleed means can be made adjustable so as to correct for differing installation variables such as closet shape, size, and water pressure, the invention is thus suitable for use in many different localities, and it can achieve a savings in the water required for a desired level of cleaning.

The objects of the invention therefore include:

(a) providing a water closet of the above kind in which a flow of pressurized water can be directed to the bowl after the flush valve has closed in response to the emptying of the tank;

(b) providing a water closet of the above kind in which the diverter valve does not require a mechanical linkage to the flush valve;

(c) providing a water closet of the above kind which is comprised of fewer parts and is relatively inexpensive to manufacture;

(d) providing a water closet of the above kind which is suitable for use with widely varying water supply pressures;

(e) providing a water closet of the above kind which achieves a savings in water use for a desired level of cleaning; and (f) providing a diverter valve for use in a fluid storage tank of the above kind.

These and still other objects and advantages of the invention will be apparent from the description which follows. In the following description, the preferred embodiments of the invention will be disclosed in reference to the accompanying drawings. These embodiments do not represent the full scope of the invention, but rather the invention may be employed in other embodiments. Reference is therefore made to the claims herein for interpreting the scope of the present invention.

DESCRIPTION OF THE PREFERRED EMBODIMENT

Figure 1:
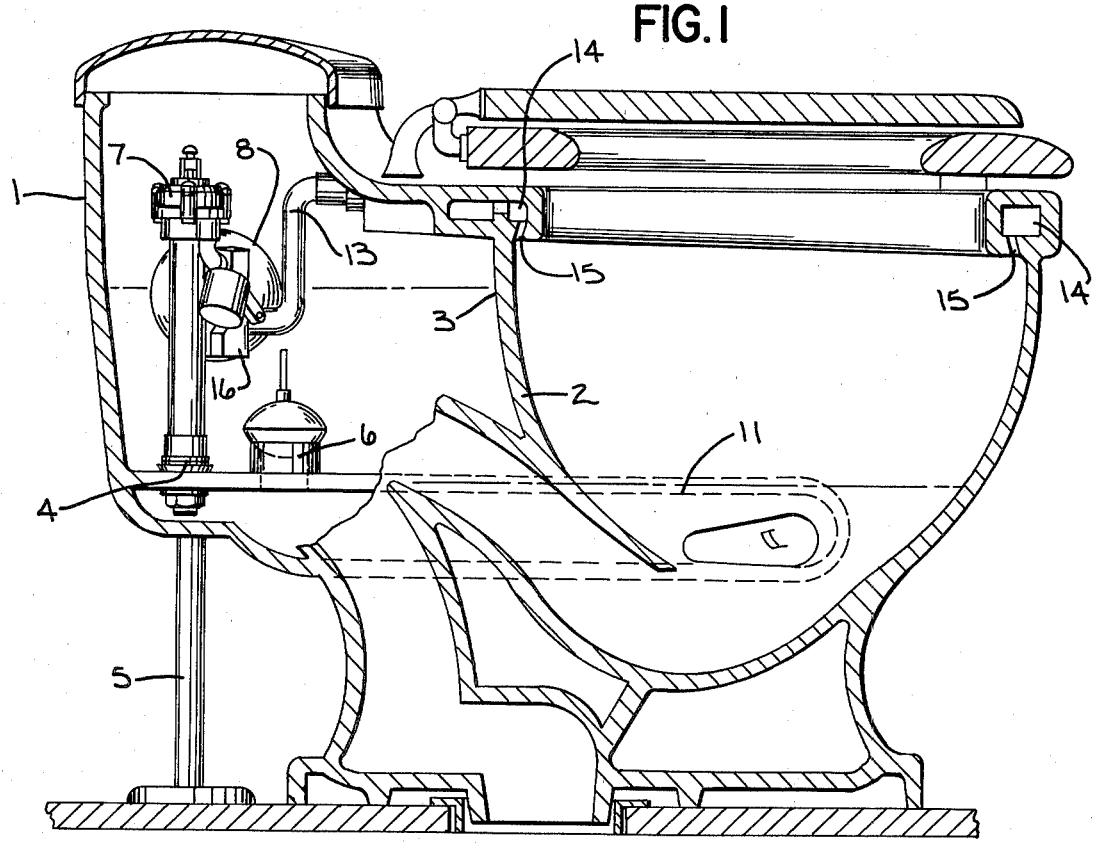
FIG. 1 is a partial sectional view of a water closet embodying the present invention.
Figure 2:
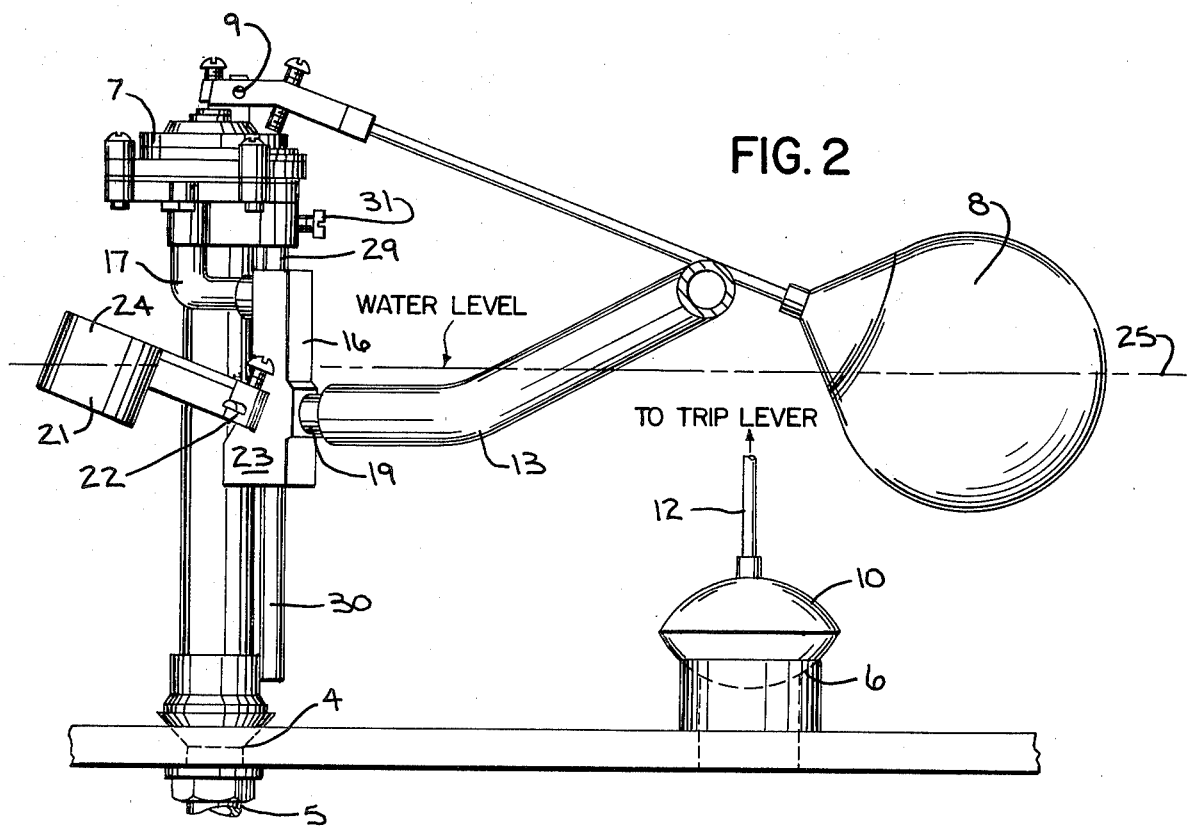
FIG. 2 is an enlarged schematic perspective view of the internal components of the water closet tank of FIG. 1.

Referring now to FIGS. 1 and 2, there is shown a water closet 1 having a bowl 2 and a storage tank 3. An inlet 4 is provided in the tank 3 for connection to a water supply line 5. There is also an outlet 6 leading from the tank 3 to the bowl 2.

Inlet valve 7 controls the flow of water to the tank 3 in response to changes in the water level of the tank 3. Inlet valves of this type are well known. One such valve is disclosed in U.S. Pat. No. 3,172,128 issued to J. A. Ducey on Mar. 9, 1965. The inlet valve 7 shown in FIG. 2 of the present application is controlled by a float ball 8 which follows the level of the water in the tank (compare FIGS. 6, 7 and 8). The float ball 8 is levered on a fulcrum 9 to govern the opening and closing of the inlet valve 7. As is conventional, when the tank 3 is filled as in FIG. 2, the inlet valve 7 shuts off water supply, and when the water level drops below the fill level, the inlet valve 7 opens.

In the usual fashion, a flush valve 10 is provided to control flow through outlet 6 and bowl connecting passage 11, and is connected to a trip lever by mechanical linkages (12) so as to be manually operable. By activating the trip lever, the flush valve 10 opens (see FIG. 6). This initiates the flushing cycle of the water closet. Also in the usual manner, flush valve 10 will automatically close the outlet 6 in response to the emptying of the tank 3 (see FIG. 7).

Returning to FIG. 1, it can be seen that in accordance with the present invention, a diversion conduit 13, which is in communication with bowl passage 14 and rim aperture 15, is provided. Diverter valve 16 is connected to the diversion conduit 13 and to the inlet valve 7.

Figure 3:
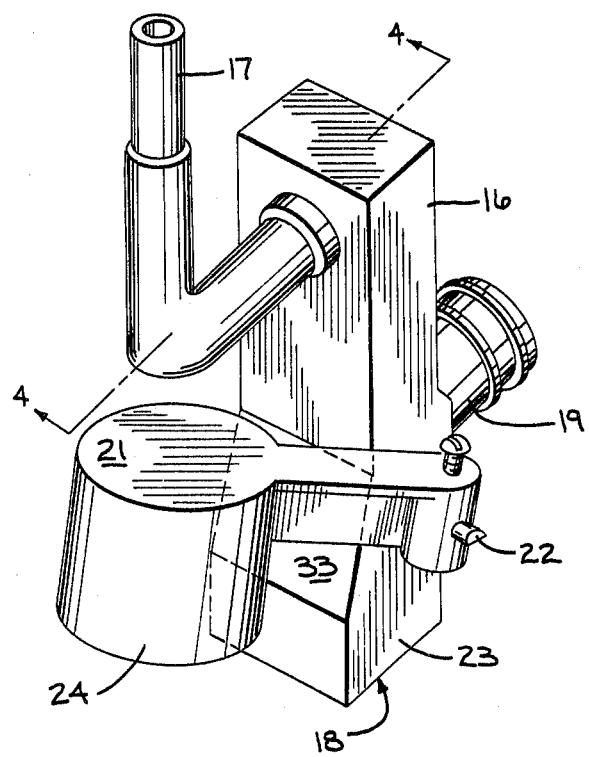
FIG. 3 is an even more enlarged perspective view (taken from a different perspective from that of FIG. 2) of the diverter valve portion of the water closet of FIG. 1.
Figure 4:
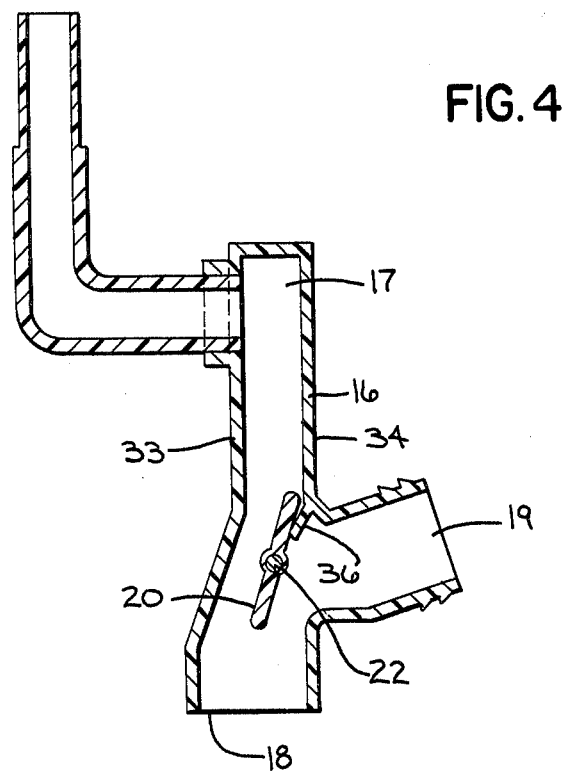
FIG. 4 is a sectional view taken along line 4—4 in FIG. 3.
Figure 5:
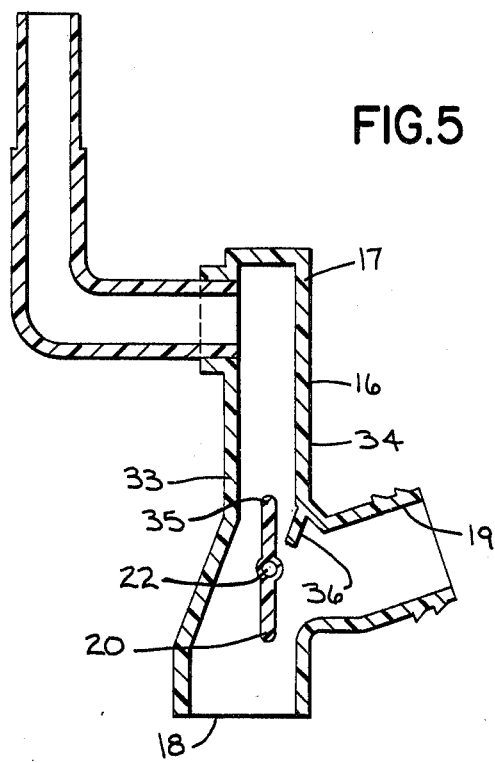
FIG. 5 is a view similar to FIG. 4 showing the diverter flap inside the diverter valve in an intermediate position.

Referring now to FIGS. 3 through 5, it can be seen that the diverter valve 16 has a housing with an inlet passage 17 for receiving a supply of water from the inlet valve 7, and a first outlet passage 18 communicating with the inlet passage 17 for delivering water exiting from the diverter valve 16 to the storage tank 3. There is also a second outlet passage 19 that communicates with the inlet passage 17, and delivers water from the diverter valve 16 to the diversion conduit 13 and ultimately the bowl rim. The diverter valve 16 (as shown in FIG. 4) is formed with part of inlet passage 17 and part of outlet passage 18 vertically aligned, and has outlet passage 19 intersect the inlet passage 17 transversely.

Diverter means or flap 20 is mounted at the junction of the three diverter valve passages 17, 18 and 19. The flap 20 proportions the flow of water between the outlet passages 18 and 19. A water level sensing means 21 is connected to the flap 20 to move the flap 20 in response to changes in the water level of the tank. The water level sensing means 21 (which is best seen in FIG. 3) comprises an axle 22 rotatably mounted in a wall 23 of a diverter passage with one end projecting into the passage (as shown in FIG. 4) and one end projecting to the exterior of the diverter valve (as shown in FIG. 3) in combination with a float 24. The float 24 is mounted on the exterior end of the axle 22 to follow the water level of the tank, and thereby cause the axle 22 to rotate. The flap 20 is keyed onto the axle 22 to rotate therewith. It will be appreciated that as an alternative, the axle can be formed integral with the flap, or the axle integral with the float.

The operation of the water closet is as follows. At the beginning of the flush cycle, the water closet components are in the position shown in FIG. 2. As the water level 25 is at the fill level, the float ball 8 is held in its uppermost position, and the inlet valve 7 is thereby held closed. Float 24 on the diverter valve 16 is also held in its uppermost position, and flap 20 is thereby held in the position shown in FIG. 4.

Figure 6:
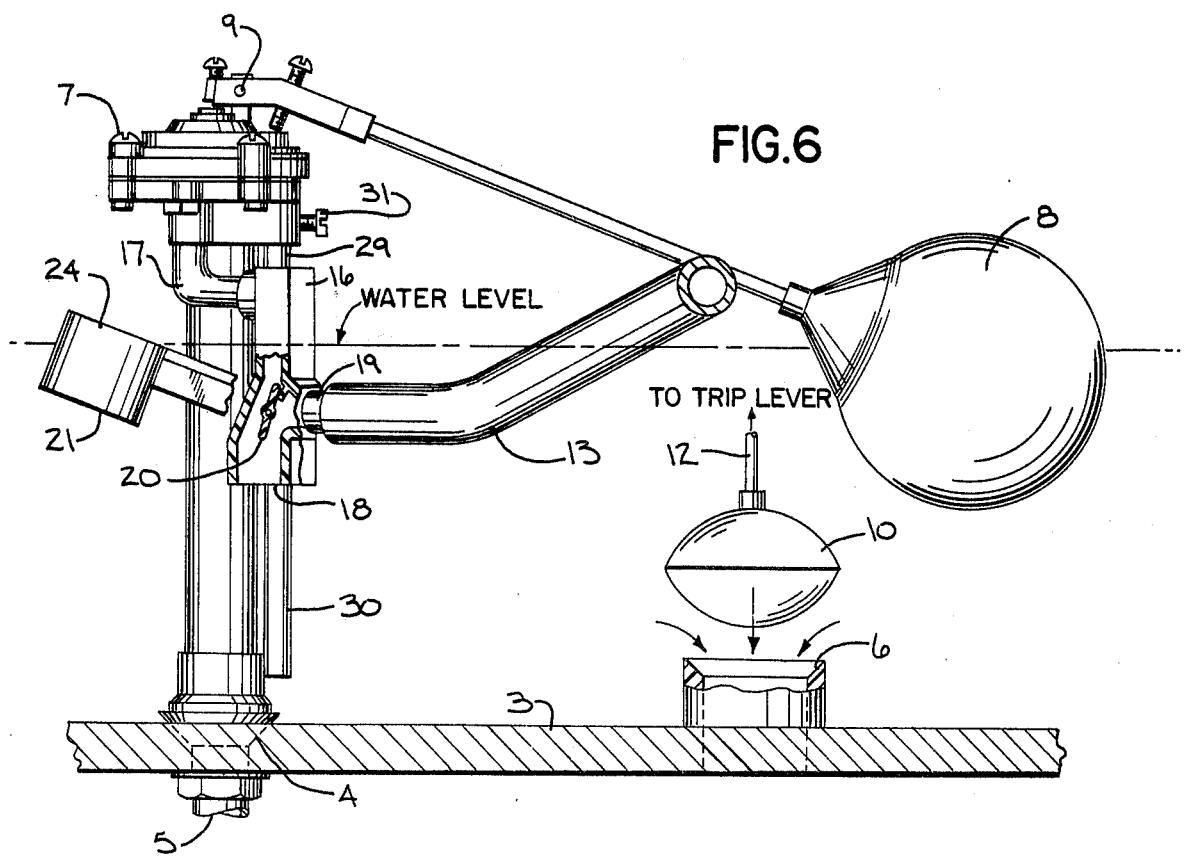
FIG. 6 is a view similar to FIG. 2, with the exception that the diverter valve is partially fragmented and broken away and the flush valve has been raised to start the flush cycle.

To initiate a flushing cycle, the trip lever is manually operated causing the flush valve ball 10 to open the outlet 6 (see FIG. 6). Water is then discharged from the tank through the outlet 6, and passage 11 to the bowl 2. As the water level in the tank 3 begins to drop, float ball 8 begins to drop, opening the inlet valve 7 and allowing water from the supply line 5 to pass through the inlet valve 7 to the diverter valve inlet passage 17. Because of the initial positioning of the flap 20, water is at this point directed towards refilling the tank 3 through outlet passage 18. However, because water is rushing out of the tank 3 through the outlet 6 much faster than it is being replaced from passage 18, the water level in the tank continues to drop.

Figure 7:
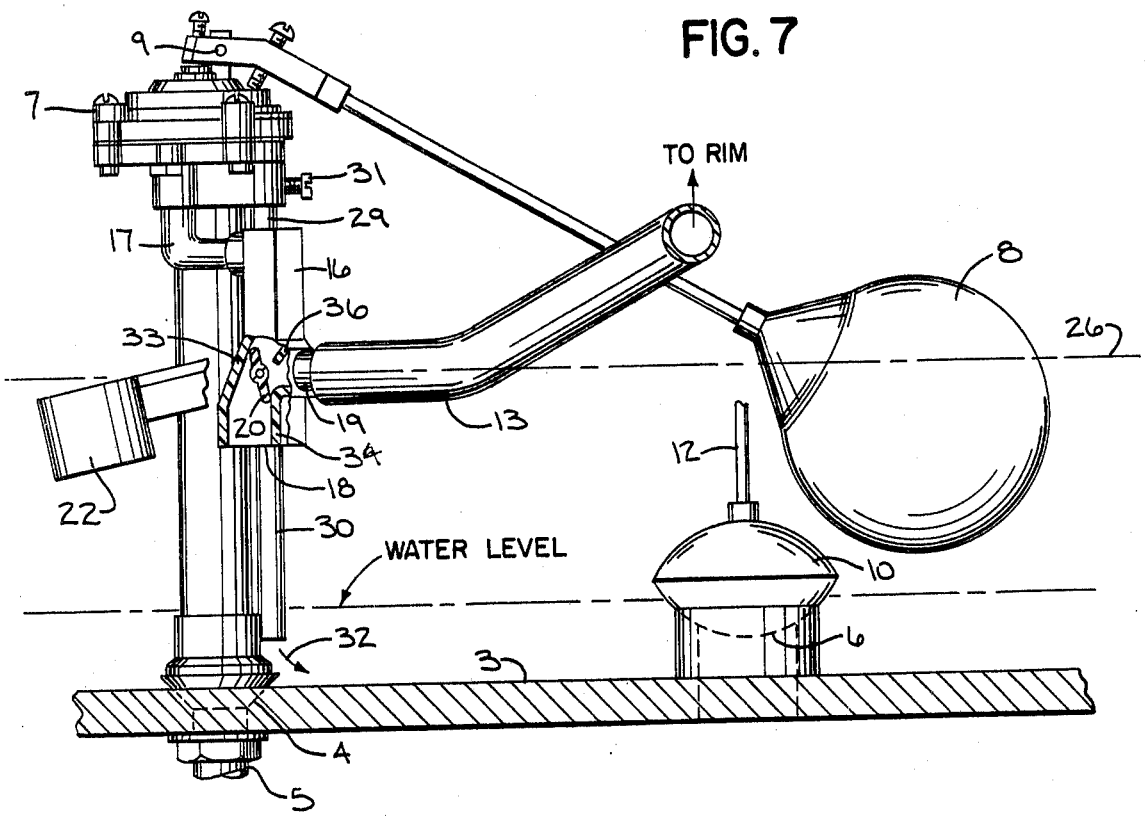
FIG. 7 is a view similar to FIG. 6, with the exception that the water level in the tank has dropped to the point that the flush valve has once again closed.

The diverter valve 16 is positioned such that the diverter float 24 begins to follow the water level downward when the water level has dropped to a predetermined diversion level 26 (see FIG. 7). This causes the flap 20 to move to the position shown in FIG. 7. In this position the flap 20 will direct pressurized water from the supply towards passage 19, the diversion conduit 13, and ultimately to the bowl conduit 14 and bowl 2. When the water level has dropped further below the diversion level 26 to the lowest water level (as in FIG. 7), the flush valve 10 will close automatically. But, in accordance with the present invention, this will not stop flow to the bowl conduit 14 which will continue.

It will be appreciated that to refill the tank from the level shown in FIG. 7, it is necessary to have some means of letting supply water flow to the tank even after diversion. This is achieved by a bleed means or line 29. The bleed line is connected to the inlet valve 7 such that whenever water flows through inlet valve 7, some water also flows through the bleed line 29. In an especially preferred construction, the bleed line comprises a hush tube 30 extending downwardly along the side of the inlet supply line. An adjustable valve such as screw valve 31 is located on the hush tube to control the rate of flow through the hush tube 30, thereby making the system adaptable to many different applications.

Because the bleed line 29 receives water whenever the inlet valve 7 receives water, water will pass through the bleed line and out the bottom of the hush tube 30 in the direction of the arrow 32 (see FIG. 7). This will result in the level of water in the tank being raised after the tank has emptied even though water is not flowing through outlet passage 18 in the diverter valve 16.

The hush tube 30 delivers water to the tank at a much lower flow rate than the diverter 16 delivers water to the rim. The higher flow rate to the rim results in an improved cleaning of the bowl throughout the evacuation of the bowl, and a rapid refill of the bowl to the seal height. In addition, in an especially preferred embodiment the predetermined tank diversion water level 26 is located such that it is only slightly higher than the lowest level of the tank water. Therefore, the low flow rate to the tank through the hush tube is sufficient to raise the water level from its lowest level back to level 26 in a relatively short time duration after the tank has emptied. In this regard, the screw valve 31 controls the flow to the tank such that the time required to refill the bowl can be made the same as that required to raise the tank water to level 26. The adjustability of the bleed line therefore makes it possible to set up the water closet to achieve a saving of water.

Figure 8:
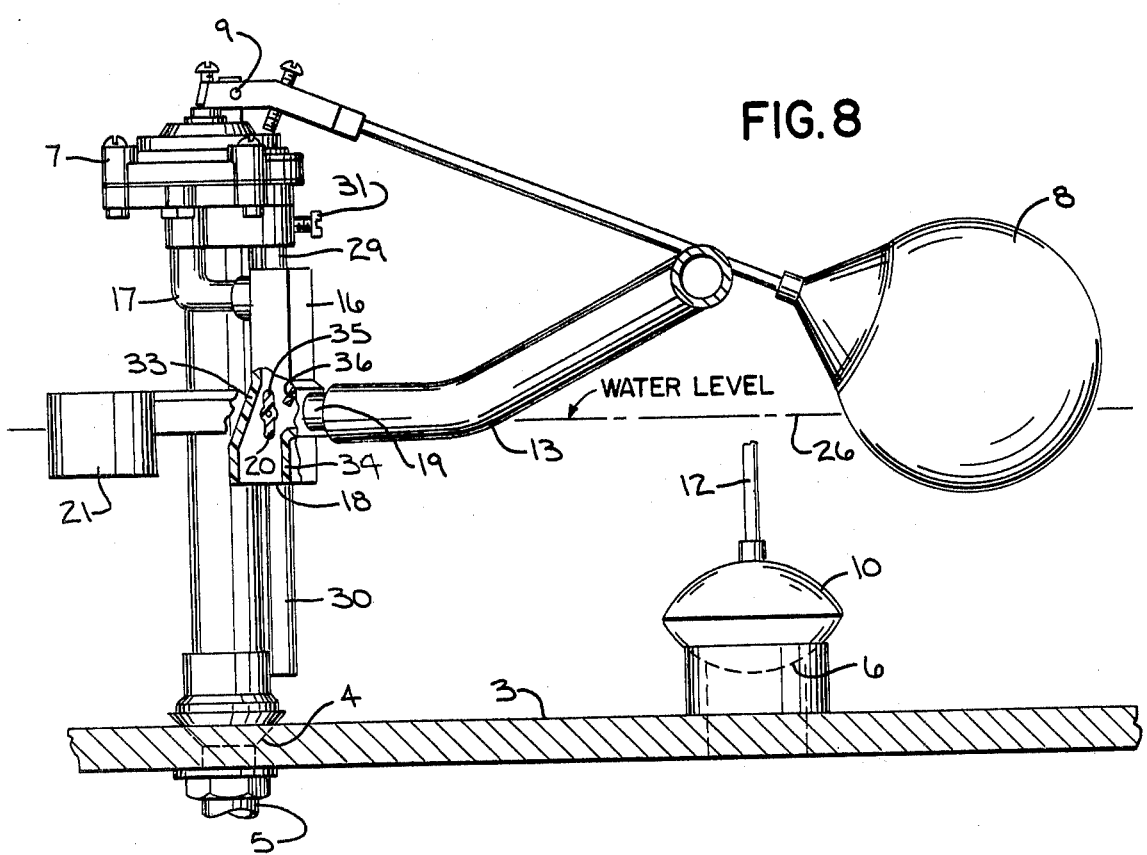
FIG. 8 is a view similar to FIG. 7, with the exception that the tank has been partly refilled.

When the water level in the tank has again reached the level shown in FIG. 8, float 24 begins to move the flap 20 back to its original position. This cuts off the flow of pressurized water to the rim, and redirects inlet flow through outlet passage 18 to the storage tank 3.

The flushing cycle is then completed by water continuing to fill the tank through bleed line 29 and diverter outlet passage 18 until the fill level 25 is re-established (FIG. 2). At this point, float ball 8 will have risen far enough so as to shut off the inlet valve 7. The toilet will then again be ready for flushing.

As seen in FIGS. 5, 7 and 8, the diverter valve 16 has a sidewall 33 on one side of the flap 20, and an opposite sidewall 34 adjacent the outlet passage 19. When the flap 20 begins to move from the position shown in FIG. 7 (as the water level in the tank is rising), the gap between the inlet end 35 of the flap 20 and the first sidewall 33 is much less than the gap between the inlet end 35 and the second sidewall 34. Because of this, there is a pressure imbalance which interferes with movement of the flap 20. When this force is coupled with the force of gravity acting on the float 24, there can be considerable resistance to the bouyancy force of the water acting on the float 24. These forces may cause the flap 20 to flutter as the tank is filling. Therefore, to minimize this fluttering, it is desirable that a projection or baffle 36 is formed on wall 34 adjacent inlet end 35 of the flap 20 so as to equalize water pressure imbalances when the water level of the tank is rising.

From the above description, it can be seen that the diverter valve allows pressurized water to be directed to the rim of a toilet bowl to assist in the cleaning of the bowl. This diversion continues even after the stored water has completely emptied out of the tank. Further, because the diversion is initiated prior to the time the tank has completely emptied, for a period of time there is water flow from both the tank and from the pressurized water line. Better cleaning and evacuation of the bowl is thereby achieved.

This result is accomplished without the need for complex mechanical linkages, and gives the designer of a tank such as a low profile tank great flexibility in locating the trip lever, flush valve, and the other components of the water closet. The system is usable with a wide range of water supply pressures and closet styles because of the adjustability feature of the bleed line. Moreover, the diverter valve can be constructed from a variety of materials including relatively inexpensive plastics, and assembly and repair of the valve is relatively easy.

Although especially preferred embodiments of the invention have been described above, it should be noted that the invention is not so limited. In this regard, there may be various other modifications and changes to these embodiments which are within the scope of the invention. For example, the diverter flap 20 might be so constructed and positioned in relation to the sidewalls 34 and 35 so as to allow some bleed of water to outlet passage 18 even when most of the supply flow is diverted to passage 19. Such a structure would then act as the bleed means. Such modifications and other modifications are meant to be within the scope of the invention. Therefore, the invention is not to be limited by the illustrative description above, but by the claims which are below.

I claim:

1. In a water closet of the type in which there is a bowl, a storage tank, an inlet in the tank for connection to a supply of water, an outlet leading from the tank to the bowl, an inlet valve which controls the flow of water to the tank in response to changes in the water level of the tank, a flush valve controlling the discharge of water through the outlet to the bowl, the flush valve being manually operable so as to initiate a flushing cycle of the water closet and automatically closing in response to the emptying of the storage tank, and a diversion conduit for directing water from the inlet directly to the bowl, the improvement comprising:

a diverter valve having a housing with an inlet passage for receiving a supply of water from the inlet valve, a first outlet passage communicating with said inlet passage for delivering water exiting from the diverter valve to the storage tank, and a second outlet passage communicating with said inlet passage for delivering water exiting from the diverter valve to the diversion conduit;

a flap mounted in a diverter valve passage for proportioning the flow of water between the two outlet passages;

water level sensing means connected to the flap to activate the flap in response to changes in the water level of the tank;

said flap being positioned by the water level sensing means to direct water to the first outlet passage when the flush cycle of the water closet is first initiated;

said flap being positioned by the water level sensing means to direct water to the second outlet passage when the water level in the storage tank has dropped below a predetermined diversion level;

said water level sensing means acting to allow continued flow to the second outlet passage after the flush valve has closed in response to the emptying of the tank; and bleed means in communication with the water supply for allowing a portion of the water supply to flow into the storage tank when the water level is below the diversion level so as to raise the water level above the diversion level.

2. The water closet of claim 1, wherein:

the water level sensing means comprises an axle rotatably mounted in a wall of a diverter valve passage with one end projecting into the passage and one end projecting to the exterior of the diverter valve, and a float mounted on the exterior end of the axle to follow the water level of the tank from the diversion level to a second lower water level, said axle rotating in response to this movement of the float; and the flap is mounted on the axle to rotate therewith, and positioned in the diverter valve passage such that movement of the axle and float causes the flap to direct water towards the first outlet passage when the water level in the tank is above the diversion level, and towards the second outlet passage when the water level is below the diversion level.

3. The water closet of claim 2, further comprising:

a projection extending inwardly from an interior wall of a diverter valve passage near an inlet end of the flap, said projection being formed on the side of the flap adjacent the second outlet passage so as to lower water pressure imbalances in the diverter valve as the water level in the tank rises.

4. The water closet of claim 3, wherein the inlet passage and the first outlet passage are vertically aligned with respect to each other, and the second outlet passage intersects the inlet passage transversely.

5. The water closet of claim 1, wherein the bleed means comprises:

a hush tube extending downwardly from the inlet valve into the storage tank; and an adjustable valve affixed on the hush tube for control of the flow of water through the hush tube independently of the inlet valve.

* * * * *